United States Patent
Hoch et al.

(10) Patent No.: US 6,180,554 B1
(45) Date of Patent: Jan. 30, 2001

(54) CATALYST SYSTEM FOR THE PRODUCTION OF OLEFIN (CO)POLYMERS

(75) Inventors: Martin Hoch, Solingen; Johannes-Rudolf Jansen, Monheim; Thomas Essert, Overath; Andreas Sattler, Düsseldorf; Jürgen Schneider, Köln, all of (DE)

(73) Assignee: Bayer Aktiengesellschaft, Leverkusen (DE)

( * ) Notice: Under 35 U.S.C. 154(b), the term of this patent shall be extended for 0 days.

(21) Appl. No.: 09/338,418

(22) Filed: Jun. 22, 1999

(30) Foreign Application Priority Data

Jun. 24, 1998 (DE) ............................................ 198 28 107

(51) Int. Cl.⁷ ............................ B01J 21/00; B01J 23/00; B01J 23/20; B01J 23/22

(52) U.S. Cl. ..................... 502/127; 502/103; 502/118; 502/125; 502/128; 502/150; 502/172; 526/142; 526/143; 526/144; 526/348.6; 526/916

(58) Field of Search ..................... 502/103, 118, 502/125, 127, 128, 150, 172; 526/142, 143, 144, 348.6, 916

(56) References Cited

U.S. PATENT DOCUMENTS

| | | | |
|---|---|---|---|
| 3,301,834 | 1/1967 | Christman | 260/80.5 |
| 3,380,981 | 4/1968 | Miller et al. | 260/93.7 |
| 3,622,548 | 11/1971 | Ernde et al. | 260/80.78 |
| 4,370,257 | * 1/1983 | Imai et al. | 252/429 B |
| 4,420,595 | * 12/1983 | Evens | 526/141 |
| 4,435,552 | 3/1984 | Evens | 526/140 |
| 5,502,125 | 3/1996 | Bordeianu et al. | 526/140 |

FOREIGN PATENT DOCUMENTS

| | | |
|---|---|---|
| 1272847 | 8/1990 | (CA) . |
| 1495698 | 1/1970 | (DE) . |
| 0 044 119 | 1/1982 | (EP) . |
| 0 346 098 | 12/1989 | (EP) . |
| 1396631 | 6/1975 | (GB) . |

OTHER PUBLICATIONS

Encycl. Polym. Sci. Eng. , 2nd edition, vol. 6, pp. 522–564, Wiley, New York (date unavailable) Ethylene–Propylene Elastomers.

Ullmann, Enzyklopädie der Technischen Chemie, vol. A23, pp. 290–292 Rubber, 3. Synethetic (date unavailable).

Ullmann Enzyklopädie der Technischen Chemie, vol. 13, p. 601, Kautschut (date unavailable).

Ullman Enzyklopädie der Technischen Chemie, vol. A 21, pp. 358–361, (date unavailable) Polymerization Process.

* cited by examiner

Primary Examiner—Mark L. Bell
Assistant Examiner—Michael J. DiVerdi
(74) Attorney, Agent, or Firm—Joseph C. Gil; Noland J. Cheung

(57) ABSTRACT

The present invention relates to a catalyst system comprising:

a) an organoaluminum compound, b) a metal compound selected from subgroups IV to VI of the periodic system, c) a reactivator in a molar ratio of 0.5 to 100 relative to compound b), wherein said reactivator comprises a characterized in that a mono- or dihalocarboxylic acid alkyl ester of the following formula:

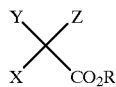

wherein X is a $C_{1-6}$ alkyl or $C_{1-6}$ alkoxy group, Y is Cl, Br or H, Z is Cl or Br and R is a $C_{1-6}$ alkyl group.

10 Claims, No Drawings

CATALYST SYSTEM FOR THE PRODUCTION OF OLEFIN (CO)POLYMERS

FIELD OF THE INVENTION

This invention relates to a catalyst system containing
a) an organoaluminum compound
b) a metal compound selected from a metal of subgroups IV to VI of the periodic system
c) a reactivator in a molar ratio of 0.5 to 100 relative to said metal compound wherein said reactivator comprises a mono- or dihalocarboxylic acid alkyl ester of the following formula:

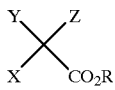

is used as the reactivator, wherein X is a $C_{1-6}$ alkyl or $C_{1-6}$ alkoxy group, Y is Cl, Br or H; Z is Cl or Br; and R is a $C_{1-6}$ alkyl group and to the use thereof in a process for the production of (co)polymers of one of more α-olefins and optionally a diene having unconjugated double bonds or a conjugated diene by (co)polymerization, and to the polymers producible using the catalyst according to the present invention.

BACKGROUND OF THE INVENTION

It is known to polymerize ethylene with other α-olefins and optionally with unconjugated dienes or to polymerize olefins or conjugated dienes alone in the presence of organometallic (Ziegler-Natta) mixed catalysts (Encycl. Polym. Sci. Eng., $2^{nd}$ edition, volume 6, pages 522 et seq., Wiley, N.Y., 1986). Polymerization is performed in solution, as a suspension or in the gas phase. The catalysts used are transition metal compounds of subgroups IV to VI of the periodic system (usually vanadium compounds in valence state +3 to +5) together with organometallic compounds of main groups I to III (usually organoaluminum compounds). Such catalytic systems exhibit very high initial activity, which, however, quickly falls due to the rapid reduction of the transition metal to low valence states (for example +2), which are inactive for polymerization purposes. Reactivators, which reoxidize the transition metal compound to return it's valence states which are active for polymerization purposes, are accordingly used in order to increase polymer yields (for example expressed as the quantity of polymer formed in g per g of transition metal).

The most efficient reactivators for catalysts containing vanadium are substances containing chlorine. Polychlorinated compounds, such as for example trichloroacetic acid esters (DE 1,570,726), perchlorocrotonic acid esters (DE 1,595,442) or hexachlorocyclopentadiene (DE 1,495,698) have proven to be effective in practice. However, these reactivators have the disadvantage that the resultant copolymers exhibit a very high chlorine content. The chlorine content has a negative effect on many polymer properties, primarily aging resistance. Moreover, polymers containing chlorine give rise to increased corrosion on plant components during working up of the copolymer after polymerization and on processing plant. Compounds having a lower chlorine content, for example mono- and dichloromalonic acid esters (CA 272,857, DE 2,344,267), usually exhibit low activity. In practice, this results in a low solids content in the polymer solution. Remedying this deficiency would require disproportionately large excesses of reactivator relative to the vanadium compound, which is economically disadvantageous. Effective compounds having a lower chlorine content have been described as reactivators in recent years, for example dichlorophenylacetic acid esters (EP 0,044,119 and 0,044,595). However, even when such reactivators are used, the chlorine content in the polymer may only be reduced to the necessary low level by means of costly polymer washing.

EP 0,680,976 discloses the use of arylhalomalonic esters as reactivators for Ziegler-Natta catalysts containing vanadium. While these compounds are indeed effective, in comparison with dichlorophenylacetic acid ethyl ester, twice the quantity of reactivators must be used in order to achieve satisfactory yields.

SUMMARY OF THE INVENTION

The object of the present invention is accordingly to provide a catalyst system for the (co)polymerization of at least one olefin and optionally a diene having unconjugated double bonds or a conjugated diene, which system comprises a reactivator which does not exhibit the disadvantages of the prior art.

This object is achieved according to the invention by the provision of a catalyst system of the present invention.

DETAILED DESCRIPTION OF THE INVENTION

The present invention relates to a catalyst system comprising
a) an organoaluminum compound,
b) a metal compound selected from a metal of subgroups IV to VI of the periodic system
c) a reactivator in a molar ratio of 0.5 to 100 relative to said metal compound wherein said reactivator comprises a mono- or dihalocarboxylic acid alkyl ester of the following formula:

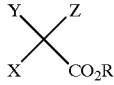

is used as the reactivator, wherein X is a $C_{1-6}$ alkyl or $C_{1-6}$ alkoxy group, Y is Cl, Br or H; Z is Cl or Br; and R is a $C_{1-6}$ alkyl group.

The group R may comprise a linear or branched or cyclic alkyl group having 1 to 6 carbon atoms, for example methyl, ethyl, n-propyl, i-propyl, n-butyl, sec.-butyl, i-butyl, tert.-butyl, n-pentyl, i-pentyl, n-hexyl, cyclopropyl or cyclohexyl.

The residue Z may be Cl or Br. Cl is preferred.

The residue Y may be H, Cl or Br. If Y is Cl or Br, Y=Z. Preferably, Y is Cl, since dichlorocarboxylic acid alkyl esters are respectively more highly active or lower in cost than monochlorocarboxylic acid alkyl esters or mono- or dibromocarboxylic acid alkyl esters.

The reactivator/transition metal molar ratio is between 0.5 and 100, preferably between 1 and 40.

Compounds of the general formula

may preferably be used as the organometallic compound a) of the catalyst system, wherein X is halogen and R is 1–6 alkyl and y is 0, 1 or 2. Methyl, ethyl, n-propyl, i-propyl, n-butyl, i-butyl, sec.-butyl, tert.-butyl, n-pentyl or n-hexyl may be considered as the alkyl group. Compounds which may be stated by way of example are ethylaluminum sesquichloride, ethylaluminum dichloride, diethylaluminum chloride, diisobutylaluminum chloride. The compounds may be used alone or as a mixture.

Any transition metal compounds of subgroups IV to VI of the periodic system may be used as the transition metal compound b), but vanadium compounds are particularly preferred. The compounds preferably comprise those of the general formula

$$X_yMR_{3-y}$$

wherein M means V or VO, X means halogen, R means an acetyl-acetonate group or a $C_{1-6}$ alkoxy group and y is 1, 2, or 3. Linear or branched alkoxy groups may be considered as the alkoxy group, such as for example methoxy, ethoxy, n-propoxy, i-propoxy, n-butoxy, i-butoxy, sec.-butoxy, tert.-butoxy, n-pentyloxy or n-hexyloxy.

$VCl_3$, $VOCl_3$, vanadium trisacetylacetonate, vanadylbisacetyl-acetonate, alkylvanadates having 1 to 6 carbon atoms etc. may, for example, be used. The compounds may be used alone or as a mixture.

Compounds containing vanadium in oxidation state +4 are furthermore preferred, very particularly preferably $VCl_4$.

The molar ratio of organometallic compound/transition metal compound is between 1 and 100, preferably between 2 and 50.

The olefins polymerizable using the catalyst system according to the invention are preferably ethylene or α-olefins having 3 to 10 carbon atoms, for example propylene, 1-butylene, isobutylene, isoprene, 1-pentene, 1-hexene, 1-octene or 1-decene. Ethylene, propylene, isoprene and isobutylene are preferably used. If copolymers are being produced from ethylene, another α-olefin and optionally a diene, propylene is preferably used as the second olefin (EPDM rubber). The ethylene content in the copolymer is in this case preferably between 25 and 85 wt. %, for rubbery copolymers preferably between 40 and 75 wt. %, in each case relative to the copolymer.

In most copolymers, unsaturated side chains are required for vulcanization. To this end, an unconjugated diene, preferably 5-ethylidene-2-norbornene, dicyclopentadiene or 1,4-hexadiene, is used as a third monomer. The concentration of the termonomer in the copolymer is 1 to 15 wt. %, preferably 1 to 10 wt. %, relative to the copolymer.

The catalyst system may also preferably be used to polymerize isobutylene with isoprene to produce butyl rubber. The proportion of isoprene in the copolymer is preferably 0.5 to 5 wt. %.

Another preferred use of the catalyst system according to the invention is for the polymerization of butadiene to produce polybutadiene. Chain-transfer agents, such as for example hydrogen, ammonia, amines, dialkylzinc, alkyl halides, acetylene hydrocarbons etc., may be used to control molecular weight.

The (co)polymerization reaction is performed in solution, in suspension or in the gas phase. The processes are familiar to the person skilled in the art; details may be found, for example, in Ullmann, Enzyklopädie der Technischen Chemie, volume A23, pages 290 et seq., volume A21, page 359, volume 18, page 740 and volume 13, page 601.

Solution (co)polymerization proceeds in inert solvents such as alkanes (butane, pentane, hexane, C6 cuts, heptane etc.) or aromatics (benzene, toluene) or also in the liquid olefin at temperatures of between –90° C. and 100° C., preferably between 20° C. and 80° C.

Suspension (co)polymerization is preferably performed without solvents, wherein excess monomer, propylene in the case of EPDM, is used as the reaction medium, which may also be present in supercritical form. It is also possible to work at very low temperature, for example down to –100°C., in a halogenated hydrocarbon, for example dichloromethane or chloromethane, as solvent.

Gas phase polymerization preferably proceeds with supported vanadium catalysts or prepolymers. Irrespective of the specific embodiment of the gas phase polymerization, the claimed reactivator is here used to increase polymerization activity.

The (co)polymers obtained using the catalyst system according to the invention are distinguished by a very low halogen content, as the organic compounds formed from the reactivator according to the invention on hydrolysis in the stripper after the polymerization contain no chlorine, but the chlorine is instead eliminated in the form of HCl. Both HCl and the organic compound may readily be removed from the polymer by washing or may also remain in the polymer.

The following Examples and Comparative Examples illustrate the invention in greater detail.

The reactivators according to the invention may be produced in accordance with the following Examples:

EXAMPLE 1

Production of methoxydichloroacetic acid methyl ester 100.0 g (0.847 mol) of oxalic acid dimethyl ester and 176.6 g (0.847 mol) of phosphorus pentachloride are heated with an oil bath at a temperature of 130–135° C. for 18 hours while being stirred in a 1 liter round-bottomed flask.

The resultant, virtually colorless solution is fractionally distilled at approx. 10 mbar using a mirrored column of a minimum length of 30 cm. The fractions around and above 60° C. are investigated for product content using proton NMR and GC-MS.

Once fractional distillation has been repeated, yields of 30–50% at a content of >90% are typically obtained (GC-MS: M-Cl, proton NMR: DMSO-d6: 3.83 ppm, s, 6H).

EXAMPLE 2

Production of 2-oxopropanoic acid 2-butyl ester 130 g (2 mol) of 2-oxopropanoic acid together with 200 g (2.7 mol) of 2-butanol and 7.5 g (40 mmol) of 4-toluenesulfonic acid are diluted with 150 ml of toluene and heated to boiling. The apparatus is equipped with a reflux condenser and a water separator. The mixture is refluxed until no further water is separated.

300 ml of water are then added and the mixture extracted three times with 100 ml portions of diethyl ether. The combined organic phases are dried with anhydrous sodium sulfate and the ether stripped out in a rotary evaporator. The residue is distilled under reduced pressure and 210 g of product are obtained.

The purity of the ester was >98% (determined by GC).

EXAMPLE 3

Production of 2,2-dichloropropanoic acid 2-butyl ester 104.0 g (0.72 mol) of 2-oxopropanoic acid 2-butyl ester from Example 2.1 are diluted with 50 ml of dry tetrachloromethane and slowly added dropwise with stirring to a boiling mixture of 260.3 g (1.25 mol) of $PCl_5$ in 300 ml of dry tetrachloromethane. Refluxing is then continued for a further 4 hours. Then, after replacing the reflux condenser, fractional distillation is performed under reduced pressure using a distillation condenser. The low-boiling components are here first removed at 40° C. and 150 mbar. The remaining reaction mixture is then transferred into a smaller distillation apparatus and fractionally distilled. The desired product was obtained in a quantity of 130 g (=90% yield). Small residual contents of 2-oxopropanoic acid 2-butyl ester and 2-chloroacrylic acid 2-butyl ester were still detected by GC-MS. No further working up was performed.

EXAMPLE 4

Synthesis of 2,2-dichloropropanoic acid-2-ethyl-ester 424.8 g (2.04 mole) of phosphorpentachloride were placed in 500 ml of dry tetrachlorocarbon and heated until boiling point. Then 232.3 g (2.00 mole) of 2-oxopropanoic acid ethylester in 200 ml of $CCl_4$ were added dropwise to the boiling mixture. The resulting mixture was refluxed for further 3 hours and after this the solvent was removed under reduced pressure. The residue was poured into iced water and the resulting mixture was extracted 3 times with diethyl ether. The organic phases were washed with an aqueous 2%-$NaHCO_3$ solution and 3 times with water. After drying over magnesium sulfate the solvent was once more removed under reduced pressure. 279.8 g of product were received (yield: 82%). By means of NMR-spectroscopy it was discovered that the product consisted of 75 wt. % of 2,2-dichloropropanoic acid-2-ethylester and 25 wt. % of 2-chloroacrylic acid-2-ethyl ester. This mixture was, without further purification, used for Example 8.

EXAMPLE 5

Comparison

The following streams were apportioned into a glass reactor having a nominal volume of 2 liters:

1833 g/h of hexane (Exxsol DHN50 from Exxon, dried by azeotropic distillation), 100 g/h of ethylene, 370 g/h of propylene and 10 g/h of ENB. The reactor contents were adjusted to 2 liters. The pressure in the reactor was 7 bar and was controlled by means of a relief valve above the gas phase of the reactor and by continuous discharge of the product into an expansion vessel. The temperature was maintained at 57° C., wherein cooling was provided by a jacket. The catalyst components were apportioned as solutions in hexane, the quantity of hexane in the catalyst streams is taken into account in the above-stated particulars:
0.035 g/h (0.2 mmol/h) of $VOCl_3$
0.995 g/h (8,0 mmol/h) of EASC (Ethylaluminum sesquichloride)
0.352 g/h (1.5 mmol/h) of DCPAE Four hours after the beginning of the test, the polymer solution was collected for 1 hour, short-stopped with methanol and the polymer obtained by steam stripping. 79 g of product were obtained. A Mooney value of 79 MU (ML 1+4, 125° C.) was measured. The composition was 45.3 wt. % propylene, 45.7 wt. % ethylene and 9.0 wt. % ENB.

EXAMPLE 6

Comparison

The same method was used as in Example 5, but using 0.161 g/h of nitropropane (1.8 mmol/h) instead of DCPAE.

A maximum concentration of only 2.5% was obtained, corresponding to the production of 47 g of polymer. Since the occurrence of white threads in the reactor indicated a content of polyethylene, no further working up was performed.

EXAMPLE 7

According to the Present Invention

The same method was used as in Example 5, but using 0.327 g/h (1.9 mmol/h) of methoxydichloroacetic acid methyl ester from Example 1 instead of DCPAE. 88 g of polymer were obtained in one hour with the composition 41.3 wt. % propylene, 58.7 wt. % ethylene and 5.8 wt. % ENB and a Mooney value of 78.2. The solvent collected during stripping was investigated by GC. No methoxydichloroacetic acid methyl ester was any longer detected.

The reactivator clearly completely hydrolyses under the stripping conditions to form, inter alia, pyruvic acid. This provides the advantage that the chlorine content in the polymer determined by the reactivator is substantially lower in this case.

EXAMPLE 8

According to the Present Invention

The following streams were apportioned into a glass reactor having a nominal volume of 2 liters:

1.2 l of hexane (Exxsol DHN5O, dried), 100 g of ethylene and 370 g of propylene were introduced and the temperature was adjusted to 45° C. The pressure was 6 bar, the monomers were further supplied according to their consumption. The catalyst components were introduced as solutions in hexane, the hexane introduced by this is taken into account in the above stated figures:
0.06 mmol of $VOCl_3$
1.7 mmol of EASC
0.04 mmol of the product of Exp. 2.3

1 hour later the polymerization was stopped by addition of water, the polymer was stabilized with 0.3 wt. % of Irganox® 1076 (Bayer AG), precipitated with ethanol and dried in a vacuum oven. 40 g of EPR having a composition of 64.7 wt. % of ethylene and 35.3 wt. % of propylene were received.

EXAMPLE 9

Comparison

The same method was used as in Example 8 was used, but using 0.04 mmole of DCPAE instead of the product of Exp. 2.3. The temperature was 44° C.

20 g of EPR having a composition of 62.2 wt. % of ethylene and 37.8 wt. % of propylene were isolated.

Comparing Example 9 to 8, the higher productivity of the inventive reactivators compared to DCPAE becomes obvious.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A catalyst system comprising:
   a) an organoaluminum compound, b) a metal compound selected from subgroups IV to VI of the periodic system, c) a reactivator in a molar ratio of 0.5 to 100 relative to compound b), wherein said reactivator comprises a mono- or dihalocarboxylic acid alkyl ester of the following formula:

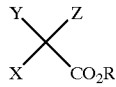

wherein X is a $C_{1-6}$ alkyl or $C_{1-6}$ alkoxy group, Y is Cl, Br or H, Z is Cl or Br and R is a $C_{1-6}$ alkyl group.

2. A catalyst system according to claim 1, wherein said reactivator is selected from the group consisting of 2,2-dichloropropionic acid n-propyl ester or 2-methoxy-2,2-dichloroacetic acid methyl ester and said metal compound is vanadium in a valence state of +3 to +5.

3. A catalyst system according to claim 1, wherein said organoaluminum compound is a compound of the following general formula:

wherein X is halogen and R is $C_{1-6}$ alkyl and y is 0, 1 or 2.

4. A catalyst system according to claim 3, wherein said organoaluminum compound is selected from the group consisting of ethylaluminum sesquichloride, ethylaluminum dichloride, diethylaluminum chloride, diisobutylaluminum chloride or mixtures thereof.

5. A catalyst system according to claim 1, wherein said metal compound is of the general formula

wherein M is defined as V or VO, X is halogen, R is an acetylacetonate group or a $C_{1-6}$ alkoxy group and y is 1, 2, or 3.

6. A catalyst system according to claim 5, wherein said metal compound is selected from the group consisting of $VCl_3$, $VOCl_3$, vanadium trisacetylacetonate, vanadylbisacetyl-acetonate, alkylvanadates having 1 to 6 carbon atoms or mixtures thereof.

7. A catalyst system according to claim 1, wherein said metal compound is $VCl_4$.

8. A process for the production of (co)polymers from one or more α-olefins and optionally a diene having unconjugated double bonds or a conjugated diene by (co)polymerization comprising contacting an olefin with a catalyst system comprising:

a) an organoaluminum compound, b) a metal compound selected from subgroups IV to VI of the periodic system, c) a reactivator in a molar ratio of 0.5 to 100 relative to compound b), wherein said reactivator comprises a characterized in that a mono- or dihalocarboxylic acid alkyl ester of the following formula:

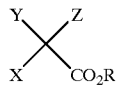

wherein X is a $C_{1-6}$ alkyl or $C_{1-6}$ alkoxy group, Y is Cl, Br or H, Z is Cl or Br and R is a $C_{1-6}$ alkyl group.

9. A process for the production of (co)polymers according to claim 8, wherein said copolymers produced are copolymers of ethylene, at least one further α-olefin and optionally, a diene having unconjugated double bonds or polymers of a conjugated diene.

10. A process for the production of (co)polymers according to claim 9, wherein said copolymers are ethylene/propylene/diene rubbers, polybutadiene or butyl rubber.

* * * * *